US012260715B1

(12) United States Patent
Padgett et al.

(10) Patent No.: US 12,260,715 B1
(45) Date of Patent: Mar. 25, 2025

(54) AUTOMATED TELLER MACHINE HAVING SUPPORT FOR USER-SELECTIVE GRAPHICAL USER INTERFACE

(71) Applicant: Truist Bank, Charlotte, NC (US)

(72) Inventors: Karie Padgett, Charlotte, NC (US); Mandy Zahl, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 18/621,427

(22) Filed: Mar. 29, 2024

(51) Int. Cl.
*G07F 19/00* (2006.01)
*G06Q 20/10* (2012.01)
*G06Q 20/32* (2012.01)

(52) U.S. Cl.
CPC ......... *G07F 19/20* (2013.01); *G06Q 20/1085* (2013.01); *G06Q 20/3221* (2013.01)

(58) Field of Classification Search
CPC . G07F 19/20; G06Q 20/1085; G06Q 20/3221

USPC ........................................................ 235/379
See application file for complete search history.

(56) References Cited

U.S. PATENT DOCUMENTS

| 7,229,007 | B1 * | 6/2007 | Swaine | G06Q 20/1085 |
| | | | | 235/379 |
| 8,474,693 | B1 * | 7/2013 | Myana | G07F 19/206 |
| | | | | 235/379 |
| 10,996,838 | B2 * | 5/2021 | Gervais | G06F 3/04892 |
| 2007/0108267 | A1 * | 5/2007 | Jonsson | G07D 9/008 |
| | | | | 235/379 |

* cited by examiner

*Primary Examiner* — Daniel A Hess
(74) *Attorney, Agent, or Firm* — Jordan IP Law, LLC; Michael A. Springs, Esq.

(57) ABSTRACT

A computing device, a computer program product, and a computer-implemented method for enabling a user to select between a default ATM operating mode in which actions are visually represented on a user interface with words, and a basic ATM operating mode in which actions are represented on the user interface with graphical images.

14 Claims, 11 Drawing Sheets

AUTOMATED TELLER MACHINE HAVING SUPPORT FOR USER-SELECTIVE GRAPHICAL USER INTERFACE

TECHNICAL FIELD

The present disclosure relates to a computing device, computer program product, and computer-implemented method for implementing an automated teller machine (ATM) and, more particularly, for an automated teller machine (ATM) that enables a user to select between a default ATM operating mode in which actions are visually represented on a user interface with words, and a basic ATM operating mode in which actions are represented on the user interface with graphical images.

BACKGROUND

Financial institutions administer ATMs in many foreign countries. ATMs generally permit a user to conduct financial transactions (e.g., deposits, withdrawals, etc.) using local currency, i.e., the currency that is domestic to the location of the ATM. Typically the UI associated with an ATM assumes that the user is familiar with the UI and has generally good skills with the UI. Some users (such as those who may have intellectual impairment or do not speak a language supported by the ATM) may require a more visual and simplified UI.

What is needed is an ATM that can enable a user to selectively choose a more simplified UI.

SUMMARY

The present disclosure relates to a computing device, a computer program product, and a computer-implemented method for enabling an ATM which provides an option to utilize a more simplified graphical user interface.

In accordance with one or more embodiments set forth, illustrated and described herein, an apparatus may comprise one or more of the following: one or more processors; and a non-transitory memory coupled to the one or more processors, the non-transitory memory including a set of instructions of computer-executable program code, which when executed by the one or more processors, cause the apparatus to: switch, responsive to receipt of a user command during an ATM session, from a default ATM operating mode in which actions are visually represented on a user interface with words to a basic ATM operating mode in which actions are represented on the user interface with graphical images.

In accordance with each respective apparatus, the set of instructions, which when executed by the one or more processors, cause the apparatus to return, in response to completion of the ATM session, to the default ATM operating mode.

In accordance with each respective apparatus, in the default ATM operating mode, currency is visually displayed on the user interface as numerals, and in the basic ATM operating mode, currency is visually displayed on the user interface as graphical images of currency/banknotes.

In accordance with each respective apparatus, the user command is transmitted via a mobile device.

In accordance with each respective apparatus, the set of instructions, when executed by the one or more processors, cause the apparatus to electronically link the ATM to the mobile device.

In accordance with each respective apparatus, the set of instructions, when executed by the one or more processors, cause the apparatus to visually display output from the ATM on the mobile device.

In accordance with each respective apparatus, signals and commands to the ATM are input by the user via the mobile device.

In accordance with one or more embodiments set forth, illustrated, and described herein, a computer program product comprising at least one non-transitory computer readable medium having with a set of instructions of computer-executable program code, which when executed by one or more processors of a computing device, cause the computing device to: switch, responsive to receipt of a user command during an ATM session, from a default ATM operating mode in which actions are visually represented on a user interface with words to a basic ATM operating mode in which actions are represented on the user interface with graphical images.

In accordance with each respective computer program product, the set of instructions, when executed by the one or more processors, cause the apparatus to return, in response to completion of the ATM session, to the default ATM operating mode.

In accordance with each respective computer program product, the default ATM operating mode, currency/banknotes is visually displayed on the user interface as numerals, and in the basic ATM operating mode, currency/banknotes is visually displayed on the user interface as graphical images of currency/banknotes.

In accordance with each respective computer program product, the user command is transmitted via a mobile device of the user.

In accordance with each respective computer program product, the set of instructions, when executed by the one or more processors, cause the computing device to electronically link the ATM to the mobile device.

In accordance with each respective computer program product, the set of instructions, when executed by the one or more processors, cause the apparatus to visually display output from the ATM on the mobile device.

In accordance with each respective computer program product, signals and commands to the ATM are input by the user via the mobile device.

In accordance with one or more embodiments set forth, illustrated and described herein, a computer-implemented method may comprise one or more of the following: switching, by a computing device responsive to receipt of a user command during an ATM session, from a default ATM operating mode in which actions are visually represented on a user interface with words to a basic ATM operating mode in which actions are represented on the user interface with visual or graphical images.

In accordance with each respective computer-implemented method, in response to completion of the ATM session, to the default ATM operating mode.

In accordance with each respective computer-implemented method, the default ATM operating mode, currency/banknotes is visually displayed on the user interface as numerals, and in the basic ATM operating mode, currency/banknotes is visually displayed on the user interface as graphical images of currency/banknotes.

In accordance with each respective computer-implemented method, the user command is transmitted via a mobile device.

In accordance with each respective computer-implemented method, further comprising electronically linking, by the computing device, the ATM to the mobile device.

In accordance with each respective computer-implemented method, further causing, by the computing device, a visual display of output from the ATM on the mobile device.

DRAWINGS

The various advantages of the exemplary embodiments will become apparent to one skilled in the art by reading the following specification and appended claims, and by referencing the following drawings, in which:

Figure 10:
Figure 11:
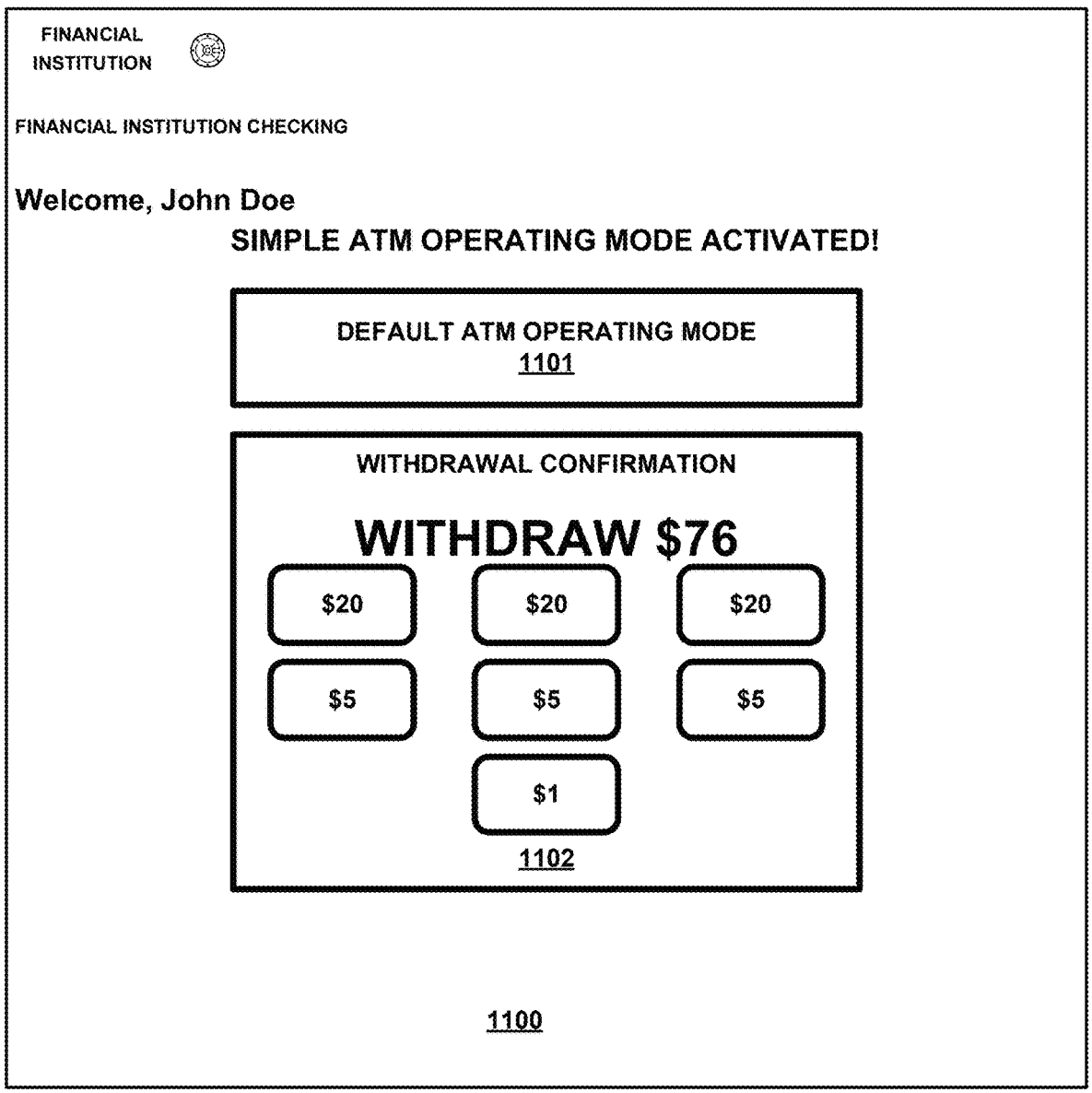

FIG. 10 illustrates a dashboard for visual display on a UI during an interactive session between a user and an ATM in a default ATM operating mode, in accordance with one or more embodiments set forth and described herein; and FIG. 11 illustrates a dashboard for visual display on a UI during a simple or basic ATM operating mode, in accordance with one or more embodiments set forth and described herein.

DESCRIPTION

Herein-below are example definitions that are provided only for illustrative purposes in this disclosure, and should not be construed to limit the scope of the one or more embodiments disclosed herein in any manner. Some terms are defined below for purposes of clarity. These terms are not rigidly restricted to these definitions. This disclosure contemplates that these terms and other terms may also be defined by their use in the context of this description.

As used herein, "application" relates to software used on a computer (usually by a client and/or client device and can be applications that are targeted or supported by specific classes of machine, such as a mobile application, desktop application, tablet application, and/or enterprise application (e.g., client device application(s) on a client device). Applications may be separated into applications which reside on a client device (e.g., VPN, PowerPoint, Excel) and cloud applications which may reside in the cloud (e.g., Gmail, GitHub). Cloud applications may correspond to applications on the client device or may be other types such as social media applications (e.g., Facebook).

As used herein, "artificial intelligence (AI)" relates to one or more computer system operable to perform one or more tasks that normally require human intelligence, such as visual perception, speech recognition, decision-making, and translation between languages.

As used herein, "machine learning" relates to an application of AI that provides computer systems the ability to automatically learn and improve from data and experience without being explicitly programmed.

As used herein, "computer" relates to a single computer or to a system of interacting computers. A computer is a combination of a hardware system, a software operating system and perhaps one or more software application programs. Examples of a computer include without limitation a personal computer (PC), laptop computer, a smart phone, a cell phone, or a wireless tablet.

As used herein, "client device" relates to any device associated with a user, including personal computers, laptops, tablets, and/or mobile smartphones.

As used herein, "engines" relates to either software engines (e.g., code embodied on a machine-readable medium or in a transmission signal) or hardware engines. Certain embodiments are described herein as including logic or a number of components, engines, or mechanisms. A "hardware engine" (or just "hardware") as used herein is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein. In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as an FPGA or an ASIC. A hardware engine may also include programmable logic or circuitry that is temporarily configured by software to perform certain operations. A hardware engine may include software encompassed within a general-purpose processor or other programmable processor. It will be appreciated that the decision to implement a hardware engine mechanically, in dedicated and permanently configured circuitry, or in temporarily configured circuitry (e.g., configured by software) may be driven by cost and time considerations. Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software may accordingly configure a processor, for example, to constitute a particular hardware engine at one instance of time and to constitute a different hardware engine at a different instance of time. Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access.

As used herein, "network" or "networks" relates to any combination of electronic communication networks, including without limitation the Internet, a local area network (LAN), a wide area network, a wireless network, and a cellular network (e.g., 4G, 5G).

As used herein, "processes" or "methods" are presented in terms of processes (or methods) or symbolic representations of operations on data stored as bits or binary digital signals within a machine memory (e.g., a computer memory). These processes or symbolic representations are examples of techniques used by those of ordinary skill in the data processing arts to convey the substance of their work to others skilled in the art. As used herein, a "process" is a self-consistent sequence of operations or similar processing leading to a desired result. In this context, processes and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information.

As used herein, "processor-Implemented engine" relates to a hardware engine implemented using one or more processors. The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

As used herein, "server" relates to a server computer or group of computers that acts to provide a service for a certain function or access to a network resource. A server may be a physical server, a hosted server in a virtual environment, or software code executing on a platform.

As used herein, "service" or "application" relates to an online server (or set of servers), and can refer to a web site and/or web application.

As used herein, "software" relates to a set of instructions and associated documentations that tells a computer what to do or how to perform a task. Software includes all different software programs on a computer, such as applications and the operating system. A software application could be written in substantially any suitable programming language, which could easily be selected by one of ordinary skill in the art. The programming language chosen should be compatible with the computer by which the software application is to be executed and, in particular, with the operating system of that computer. Examples of suitable programming languages include without limitation Object Pascal, C, C++, CGI, Java, and Java Scripts. Further, the functions of some embodiments, when described as a series of steps for a method, could be implemented as a series of software instructions for being operated by a processor, such that the embodiments could be implemented as software, hardware, or a combination thereof.

As used herein, "sensor" relates to any device, component and/or system that can perform one or more of detecting, determining, assessing, monitoring, measuring, quantifying, and sensing something.

As used herein, "real-time" relates to a level of processing responsiveness that a user, engine, or system senses as sufficiently immediate for a particular process or determination to be made, or that enables the processor to keep up with some external process.

As used herein, "user" relates to a consumer, machine entity, and/or requesting party, and may be human or machine.

In accordance with one or more embodiments set forth, illustrated, and described herein, a virtual chat communication platform is provided for a client device of a user having one or more financial accounts residing at one or more financial institution servers of a financial institution. The virtual chat communication platform enables a single user, using a single client device, to participate in multiple simultaneous virtual chat communication sessions with virtual support agents acting on behalf of the financial institution in support of serving the needs of the user. In that way, the user is not forced to cancel or end a first virtual chat communication session in order to commence two or more additional virtual chat communication sessions using the same client device.

Figure 1:
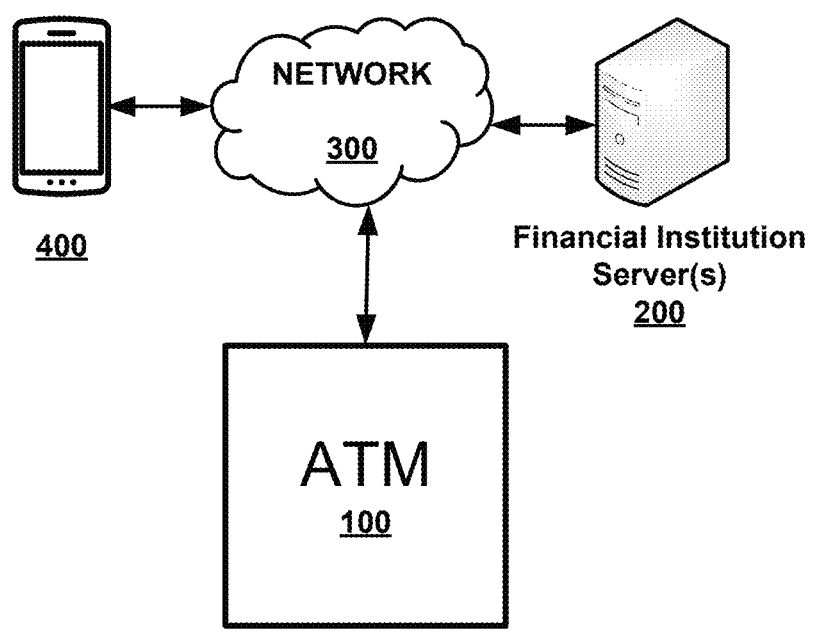
FIG. 1 illustrates a communication environment for an ATM, in accordance with one or more embodiments set forth and described herein.

Turning to the figures, in which FIG. 1 illustrates a network communication environment that facilitates communications between an ATM 100 and one or more financial institution servers 200. The ATM 100 used by a user (e.g., a financial account holder using native currency/banknotes) operating in the network communication environment facilitates user access to and user management of one or more financial accounts residing at the one or more financial institution servers 200. The communication environment includes the ATM 100, the one or more financial institution servers 200, and a communication network 300 through which communication is facilitated between the ATM 100 and the one or more financial institution servers 200.

In accordance with one or more embodiments set forth, described, and/or illustrated herein, the ATM 100 comprises any computing device including input/output devices (keypad, touch screen, buttons, etc.) in order to facilitate interaction between a user and the ATM 100. This disclosure contemplates the ATM 100 comprising any suitable form of electronic device that optimizes or otherwise transforms the performance and functionality of the one or more embodiments in a manner that falls within the spirit and scope of the principles of this disclosure.

Figure 2:
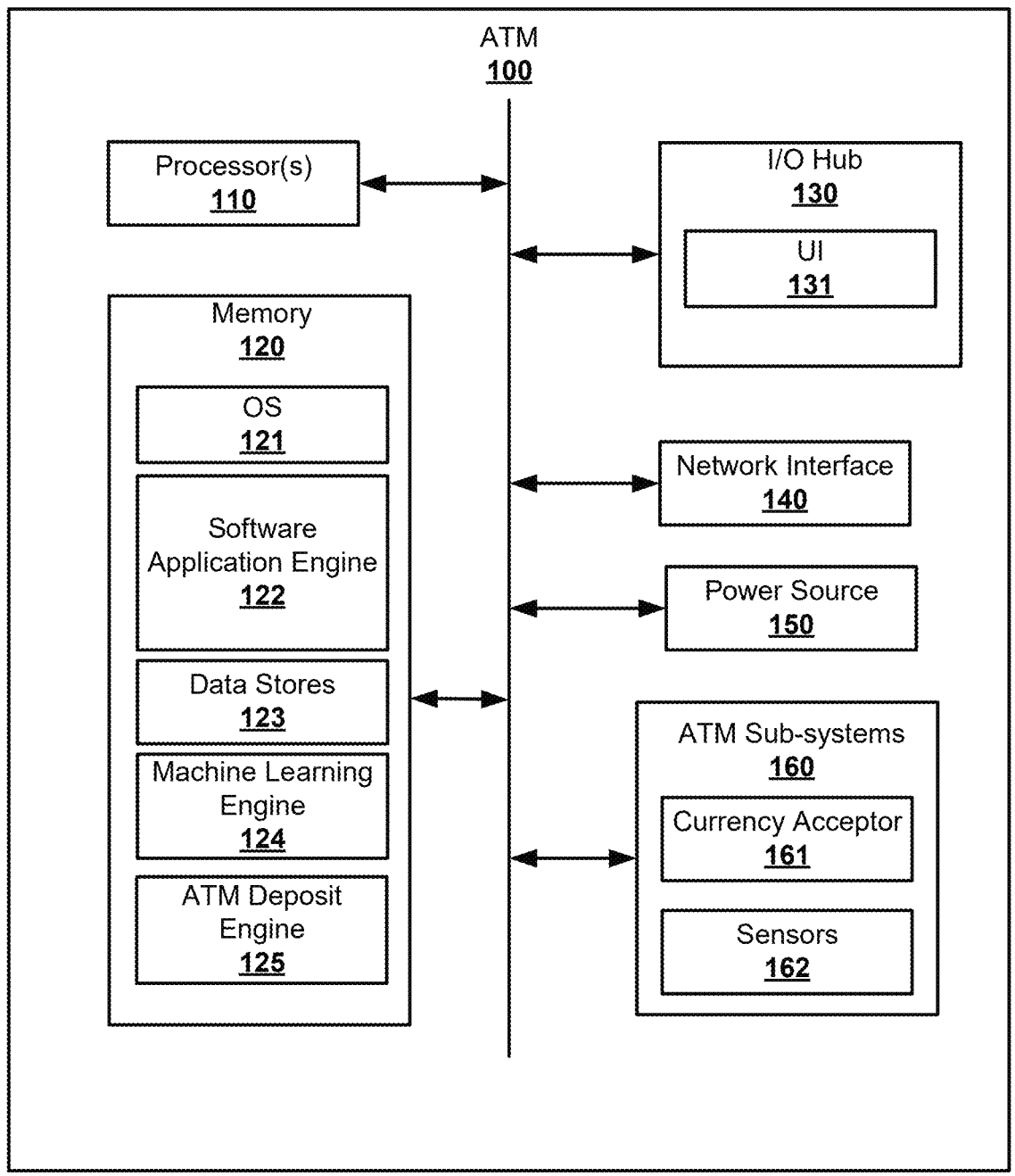
FIG. 2 illustrates a block diagram of the ATM device of FIG. 1, in accordance with one or more embodiments set forth and described herein.

In the illustrated example embodiment of FIG. 1, some of the possible operational elements of the ATM 100 are illustrated in FIG. 2 and will now be described herein. It will be understood that it is not necessary for the ATM 100 to have all the elements illustrated in FIG. 2. For example, the ATM 100 may have any combination of the various elements illustrated in FIG. 2. Moreover, the ATM 100 may have additional elements to those illustrated in FIG. 2.

The ATM 100 includes one or more processors 110, a non-transitory memory 120 operatively coupled to the one or more processors 110, an I/O hub 130, a network interface 140, a power source 150, and one or more ATM subsystems 160.

The memory 120 comprises a set of instructions of computer-executable program code. The set of instructions are executable by the one or more processors 110 to cause execution of an operating system 121 and one or more software applications of a software application engine 122 that reside in the memory 120. The one or more software applications residing in the memory 120 includes, but is not limited to, a financial institution application that is associated with the financial institution. The financial institution application comprises a mobile application or desktop application that facilitates establishment of a secure connection between the ATM 100 and the one or more financial institution servers 200. The one or more processors 110 are operable to execute the mobile application or desktop application to facilitate user access to the one or more financial accounts and user management of the one or more financial accounts.

The memory 120 also includes one or more data stores 123 that are operable to store one or more types of data. The ATM 100 may include one or more interfaces that facilitate one or more systems or engines thereof to transform, manage, retrieve, modify, add, or delete, the data residing in the data stores 123. The one or more data stores 123 may comprise volatile and/or non-volatile memory. Examples of suitable data stores 123 include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 123 may be a component of the one or more processors 110 or alternatively, may be operatively connected to the one or more processors 110 for use thereby. As set forth, described, and/or illustrated herein, "operatively connected" may include direct or indirect connections, including connections without direct physical contact.

A machine learning engine 124 can be used to make any determination that can be performed utilizing any type of machine learning (e.g., neural network, transformer, expert system, etc.).

In accordance with one or more embodiments set forth, described, and/or illustrated herein, the ATM 100 includes an I/O hub 130 operatively connected to other systems and subsystems of the ATM 100. The I/O system 130 may include one or more of an input interface, an output interface, and a network controller to facilitate communications between the ATM 100 and the one or more financial institution servers 200. The input interface and the output interface may be integrated as a single, unitary user interface 131, or alternatively, be separate as independent interfaces that are operatively connected.

As used herein, the input interface is defined as any device, software, component, system, element, or arrangement or groups thereof that enable information and/or data to be entered as input commands by a user in a manner that directs the one or more processors 110 to execute instructions. The input interface may comprise a user interface (UI), a graphical user interface (GUI), such as, for example, a display, human-machine interface (HMI), or the like. Embodiments, however, are not limited thereto, and thus, this disclosure contemplates the input interface comprising a keypad, touch screen, multi-touch screen, button, joystick, mouse, trackball, microphone and/or combinations thereof.

The user interface 131 can comprises one or more input devices such as, for example, a keypad, touch-screen, keyboard, etc., that enables a user to interact with the ATM 100.

The ATM subsystems 160 includes, but is not limited to, a currency/banknote acceptor 161 and one or more sensors 162. The currency/banknote acceptor 161 comprises a slot and an electric motor to facilitate receipt of currency (i.e., paper currency, bills, or banknotes) during deposits made by a user. The ATM subsystems 160 also includes a currency/banknote dispenser, which enables the ATM to dispense currency of different denominations. The currency/banknote dispenser can comprise a motor and a picker to pick and dispense individual banknotes.

The one or more sensors 162 are operable to, at least during a deposit of currency/banknotes by a user, dynamically detect, determine, capture, assess, monitor, measure, quantify, and/or sense information about the currency or banknote. As set forth, described, and/or illustrated herein, "sensor" means any apparatus, device, component and/or system that can perform one or more of detecting, determining, assessing, monitoring, measuring, quantifying, and sensing something. The one or more sensors 162 may be operable to detect, determine, capture, assess, monitor, measure, quantify and/or sense in real-time. As set forth, described, and/or illustrated herein, "real-time" means a level of processing responsiveness that a user or system senses as sufficiently immediate for a particular process or determination to be made, or that enables the processor to keep up with some external process. The one or more sensors 162 may be operatively connected to the one or more processors 110, the one or more data stores 123, and/or other elements, components, modules of the ATM 100. The one or more sensors 162 may be arranged, mounted, or positioned in any suitable location with respect to the currency/banknote acceptor 161.

In accordance with one or more embodiments, the one or more sensors 162 may work independently from each other, or alternatively, may work in combination with each other. The one or more 162 may be used in any combination, and may be used redundantly to validate and enhance the accuracy of the detection.

In accordance with one or more embodiments, the one or more sensors 162 may comprise, for example, image sensors (e.g., red, green, blue/RGB camera, multi-spectral infrared/IR camera). Alternatively or additionally, the one or more sensors 162 may comprise one or more image devices such as, for example, one or more cameras. As set forth, described, and/or illustrated herein, "camera" means any apparatus, device, component, and/or system that can capture visual data. Such visual data may include one or more of video information/data and image information/data. The visual data may be in any suitable form. The one or more cameras may comprise high resolution cameras. The high resolution can refer to the pixel resolution, the spatial resolution, spectral resolution, temporal resolution, and/or radiometric resolution. Alternatively or additionally, the one or more cameras may comprise high dynamic range (HDR) cameras or infrared (IR) cameras. For example, one or more of the cameras may be spatially oriented, positioned, operable, operable, and/or arranged to detect, determine, capture, assess, monitor, measure, quantify, and/or sense visual data related to currency or banknote being deposited by the user, and then transmit as sensor data to the one or more processors 110 and/or the one or processors 210.

In accordance with one or more embodiments, one or more of the cameras may comprise a lens and an image capture element. The image capture element may be any suitable type of image capturing device or system, including, for example, an area array sensor, a charge coupled device (CCD) sensor, a complementary metal oxide semiconductor (CMOS) sensor, a linear array sensor, and/or a CCD (monochrome). The image capture element may capture images in any suitable wavelength on the electromagnetic spectrum. The image capture element may capture color images and/or grayscale images. One or more of the cameras may be operable with zoom in and/or zoom out capabilities.

In accordance with one or more embodiments, one or more of the cameras may be located within the ATM 100. Alternatively or additionally, one or more of the cameras may be fixed in a position that does not change relative to the vehicle 100, and particularly, the currency/banknote acceptor 161. Alternatively or additionally, the one or more of the cameras may be dynamically movable so that its position can change relative to the currency/banknote acceptor 161 in a manner which facilitates the capture of visual data from different regions of the surface (e.g., front surface and/or rear surface) of the currency or banknote. Such movement of one or more of the cameras may be achieved in any suitable manner, such as, for example, by rotation (about one or more rotational axes), by pivoting (about a pivot axis), by sliding (along an axis), and/or by extending (along an axis).

In accordance with one or more embodiments, the one or more cameras 141 (and/or the movement thereof) may be controlled by the one or more processors 110, the ATM engine 223, the sensor engine 240, and any one or more of the modules, systems, and subsystems set forth, described, and/or illustrated herein.

As used herein, the output interface is defined as any device, software, component, system, element or arrangement or groups thereof that enable information/data to be presented to a user. The output interface may comprise one or more of a visual display or an audio display, including, but not limited to, a microphone, earphone, and/or speaker. One or more components of the ATM 100 may serve as both a component of the input interface and a component of the output interface.

The ATM 100 also includes a network interface 140 operable to facilitate connection to the network 300. The ATM 100 further includes a power source 150 that comprises a wired powered source, a wireless power source, a replaceable battery source, or a rechargeable battery source.

In accordance with one or more embodiments set forth, described, and/or illustrated herein, "processor" means any component or group of components that are operable to execute any of the processes described herein or any form of instructions to carry out such processes or cause such processes to be performed. The one or more processors may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 110 may comprise at least one hardware circuit (e.g., an integrated circuit) operable to carry out instructions contained in program code. In embodiments in which there is a plurality of processors, such processors may work independently from each other, or one or more processors may work in combination with each other.

Figure 3:
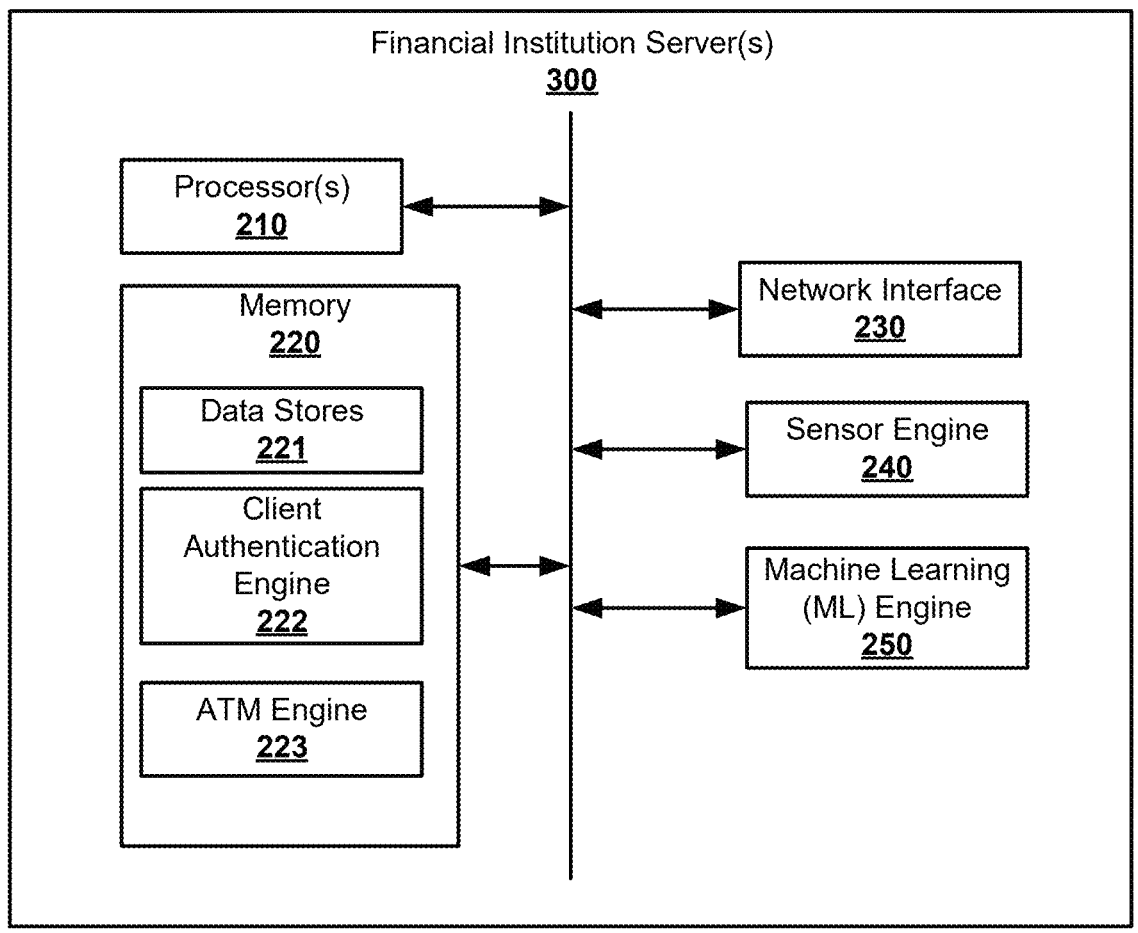
FIG. 3 illustrates a block diagram of the one or more financial institution servers of FIG. 1, in accordance with one or more embodiments set forth and described herein.

As illustrated in FIG. 3, the one or more financial institution servers 200 includes one or more processors 210, a non-transitory memory 220 operatively coupled to the one or more processors 210, a network interface 230, a sensor engine 240, and a machine learning (ML) engine 250. Some of the possible operational elements of each server in the one or more financial institution servers 200 are illustrated in FIG. 3 and will now be described herein. It will be understood that it is not necessary for each server in the one or more financial institution servers 200 to have all the elements illustrated in FIG. 3. For example, each server in the one or more financial institution servers 200 may have any combination of the various elements illustrated in FIG. 3. Moreover, each server in the one or more financial institution servers 200 may have additional elements to those illustrated in FIG. 3.

The one or more financial institution servers 200 may be controlled by a system manager (or policy manager) of the financial institution.

In accordance with one or more embodiments set forth, described, and/or illustrated herein, the one or more financial institution servers 200 may comprise a computing device, including but not limited to a server computer, a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the one or more financial institution servers 200 comprising any form of electronic device that optimizes or otherwise transforms the performance and functionality of the one or more embodiments in a manner that falls within the spirit and scope of the principles of this disclosure.

The memory 220 comprises a set of instructions of computer-executable program code. The set of instructions are executable by the one or more processors 210 in manner that facilitates control of a user or client authentication engine 222, a mobile financial institution application engine 223 having one or more mobile financial institution applications that reside in the memory 220, and an ATM engine 223 to facilitate financial transactions that are performed at an ATM (e.g., ATM 100) and/or mobile device 400. In accordance with one or more embodiments set forth, described, and/or illustrated herein, the one or more financial institution servers 200 may individually or collectively execute the instructions (which are stored) to perform (or cause to be performed) any one or more of the methodologies set forth, described, and illustrated herein.

The memory 220 also includes one or more data stores 221 that are operable to store one or more types of data, including but not limited to, user account data, user authentication data, sensor data, etc. The one or more data stores 221 may comprise volatile and/or non-volatile memory. Examples of suitable data stores 221 include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 221 may be a component of the one or more processors 210, or alternatively, may be operatively connected to the one or more processors 210 for use thereby. As set forth, described, and/or illustrated herein, "operatively connected" may include direct or indirect connections, including connections without direct physical contact.

The memory 220 may include a single machine-readable medium, or a plurality of media (e.g., a centralized or distributed database, or associated caches and servers) operable to store the instructions. The term "machine-readable medium" shall also be taken to include any medium, or combination of multiple media, that is capable of storing instructions (e.g., software) for execution by a server (e.g., server), such that the instructions, when executed by the one or more processors 210 cause the one or more financial institution servers 200 and/or the ATM 100 and/or the mobile device 400 to perform any one or more of the methodologies set forth, described, and illustrated herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. The memory 220 can store computer readable program code and data which, when executed by the one or more processors 210 (or other processor) can implement (or cause to be implemented) any of the features and methodologies described herein.

The computer-executable program code may instruct the one or more processors 210 to cause the user authentication engine 221 to authenticate a user in order to gain user access to the one or more financial accounts. The user authentication engine 221 may be caused to request user input user data or user identification that include, but are not limited to, user identity (e.g., username), a user passcode, a cookie, user biometric data, a private key, a token, and/or another suitable authentication data or information.

The computer-executable program code may instruct the one or more processors 210 to execute certain logic, data-processing, and data-storing functions of the one or more financial institution servers 200 and/or the ATM 100 and/or the mobile device 400, in addition to certain communication functions of the one or more financial institution servers 200. The one or more mobile financial institution applications can utilize a mobile financial institution application engine which is operable to communicate with the ATM 100 and the mobile device 400 in a manner which facilitates user access to the one or more financial accounts in addition to user management of the one or more financial accounts based on successful user authentication.

The sensor module 240 is operable, at least during execution of the mobile application or desktop application by the ATM 100, to control the one or more sensors.

The ML engine 250 may include one or more ML algorithms to train one or more machine learning models of the one or more financial institution servers 200 based on data and/or information resided in the memory 220. The ML algorithms may include one or more of a linear regression algorithm, a logical regression algorithm, or a combination of different algorithms. A neural network may also be used to train the system based on the received data. The ML engine 250 may analyze the received data and/or information, and transform the data and/or information in a manner which provides enhanced communication between the ATM 100 and the one or more financial institution servers 200, while also enhancing user access and management of the one or more financial accounts. The data and/or information may also be up-linked to other systems and engines in the one or more financial institution servers 200 for further processing to discover additional information that may be used to enhance the understanding of the information.

In accordance with one or more embodiments set forth, described, and/or illustrated herein, the network 300 may comprise a wireless network, a wired network, or any suitable combination thereof. For example, the network 300 is operable to support connectivity using any protocol or technology, including, but not limited to wireless cellular, wireless broadband, wireless local area network (WLAN), wireless personal area network (WPAN), wireless short distance communication, Global System for Mobile Communication (GSM), or any other suitable wired or wireless network operable to transmit and receive a data signal.

Figure 4:
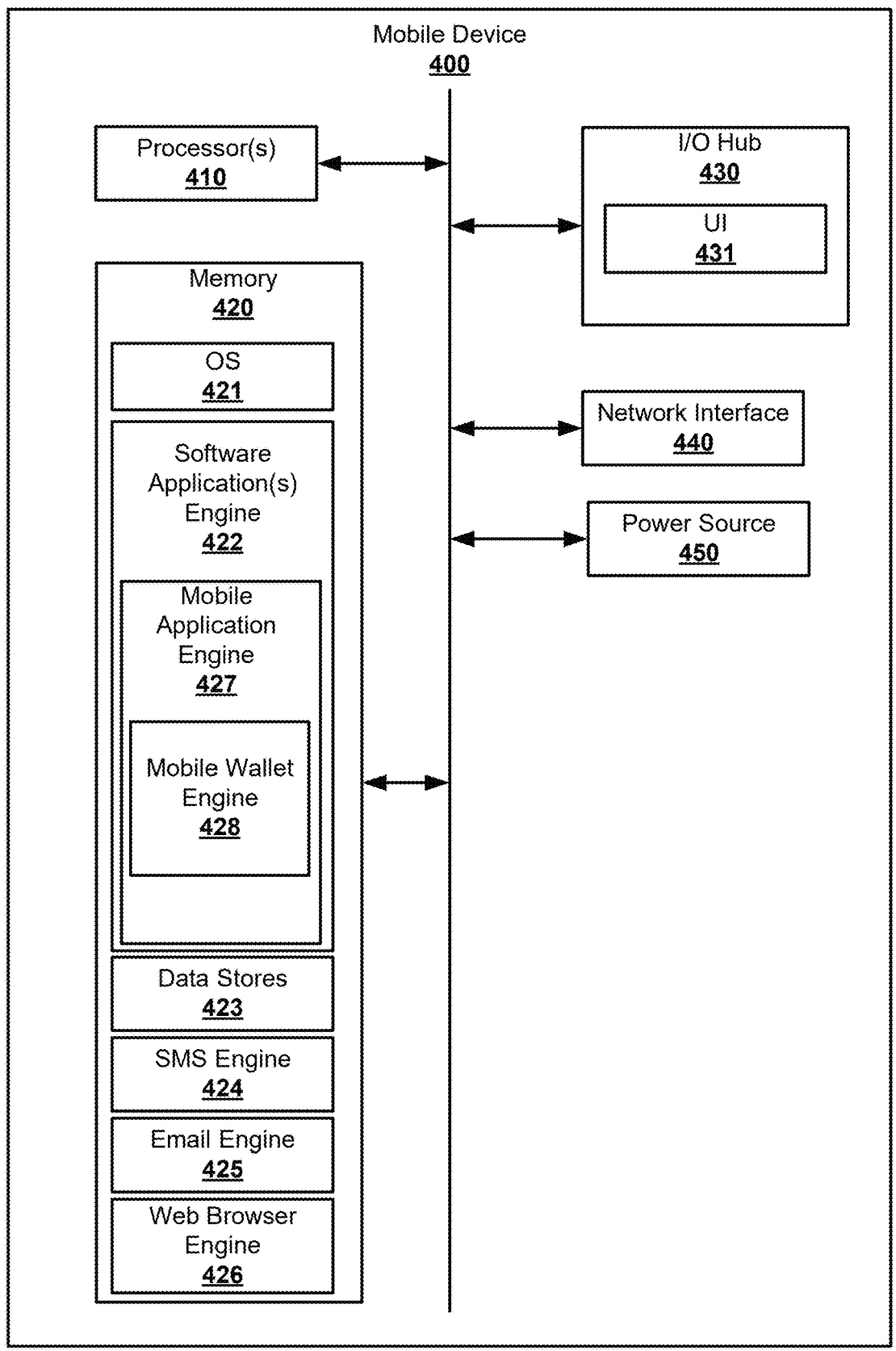
FIG. 4 illustrates a block diagram of mobile device of FIG. 1, in accordance with one or more embodiments set forth and described herein.

In the illustrated example embodiment of FIG. 4, the user or client device comprises a mobile device 400. Some of the possible operational elements of the mobile device 400 are illustrated in FIG. 24 and will now be described herein. It will be understood that it is not necessary for the mobile device 400 to have all the elements illustrated in FIG. 4. For example, the mobile device 400 may have any combination of the various elements illustrated in FIG. 4. Moreover, the mobile device 400 may have additional elements to those illustrated in FIG. 4.

The mobile device 400 includes one or more processors 410, a non-transitory memory 420 operatively coupled to the one or more processors 410, an I/O hub 430, a network interface 440, and a power source 450.

The memory 420 comprises a set of instructions of computer-executable program code. The set of instructions are executable by the one or more processors 410 to cause execution of an operating system 421 and one or more software applications of a software application module 422 that reside in the memory 420. The one or more software applications residing in the memory 420 includes, but is not limited to, a financial institution application that is associated with the financial institution. The financial institution application comprises a mobile application engine 427 that facilitates establishment of a secure, network connection between the mobile device 400 and the one or more financial institution servers 400. The one or more processors 410 are operable to execute the mobile application to facilitate user access to the one or more user accounts and user management of the one or more user accounts. The mobile application engine 427 includes a mobile wallet engine 428 that facilitates generation of one or more digital wallets associated with the one or more user financial accounts. The one or more processors 410 are operable to execute the mobile application engine 427 to facilitate user access to the one or more user financial accounts and user management of the one or more user financial accounts.

The memory 420 also includes one or more data stores 423 that are operable to store one or more types of data. The mobile device 400 may include one or more interfaces that facilitate one or more systems or modules thereof to transform, manage, retrieve, modify, add, or delete, the data residing in the data stores 423. The one or more data stores 423 may comprise volatile and/or non-volatile memory. Examples of suitable data stores 423 include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 423 may be a component of the one or more processors 410, or alternatively, may be operatively connected to the one or more processors 410 for use thereby. As set forth, described, and/or illustrated herein, "operatively connected" may include direct or indirect connections, including connections without direct physical contact.

The memory 420 also includes an SMS engine 424 operable to facilitate user transmission and receipt of text messages via the mobile device 400 though the network 300. In one example embodiment, a user may receive text messages from the financial institution that are associated with the user access and the user management of the one or more user accounts. An email engine 425 is operable to facilitate user transmission and receipt of email messages via the mobile device 400 through the network 300. In one example embodiment, a user may receive email messages from the financial institution that are associated with the user access and the user management of the one or more user financial accounts. A user may utilize a web browser engine 426 that is operable to facilitate user access to one or more websites associated with the financial institution through the network 300.

In accordance with one or more embodiments set forth, described, and/or illustrated herein, the mobile device 400 includes an I/O hub 430 operatively connected to other systems and subsystems of the mobile device 400. The I/O hub 430 may include one or more of an input interface, an output interface, and a network controller to facilitate communications between the mobile device 400 and the one or more financial institution servers 200. The input interface and the output interface may be integrated as a single, unitary user interface 431, or alternatively, be separate as independent interfaces that are operatively connected.

As used herein, the input interface is defined as any device, software, component, system, element, or arrangement or groups thereof that enable information and/or data to be entered as input commands by a user in a manner that directs the one or more processors 410 to execute instructions. The input interface may comprise a user interface (UI), a graphical user interface (GUI), such as, for example, a display, human-machine interface (HMI), or the like. Embodiments, however, are not limited thereto, and thus, this disclosure contemplates the input interface comprising a keypad, touch screen, multi-touch screen, button, joystick, mouse, trackball, microphone and/or combinations thereof.

As used herein, the output interface is defined as any device, software, component, system, element or arrangement or groups thereof that enable information/data to be presented to a user. The output interface may comprise one or more of a visual display or an audio display, including, but not limited to, a microphone, earphone, and/or speaker. One or more components of the mobile device 400 may serve as both a component of the input interface and a component of the output interface.

The mobile device 400 includes a network interface 440 operable to facilitate connection to the network 300. The mobile device 400 also includes power source 450 that comprises a wired powered source, a wireless power source, a replaceable battery source, or a rechargeable battery source.

A user having foreign currency/banknotes must generally have the foreign currency/banknotes converted and exchanged to local or native currency/banknotes by a financial institution or third-party. As used herein, "foreign currency/banknotes" is currency/banknotes that is not local or native local to the currency/banknotes upon which the financial account is based. For example, foreign currency/banknotes for a user having a financial account in the U.S. is any currency/banknotes that is not US dollars (USD).

In accordance with one or more embodiments set forth and described herein, a user can, in real-time, conduct a deposit of foreign currency/banknotes at an ATM, have the foreign currency/banknotes converted to native currency/banknotes, and then credited into the financial account.

Figure 5:
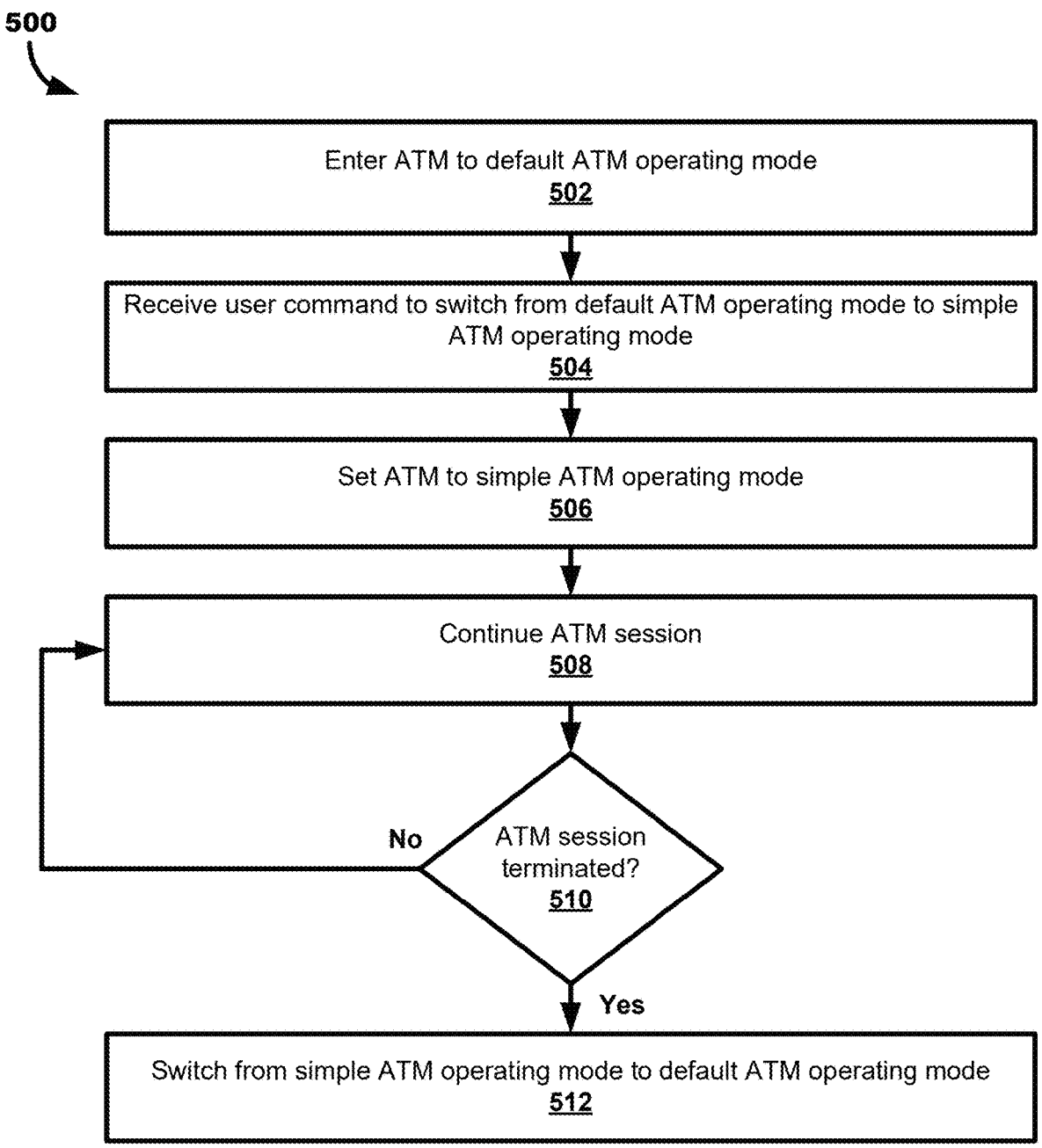
FIG. 5 illustrates a computer-implemented method of operating an ATM, in accordance with one or more embodiments set forth and described herein.
Figure 6:
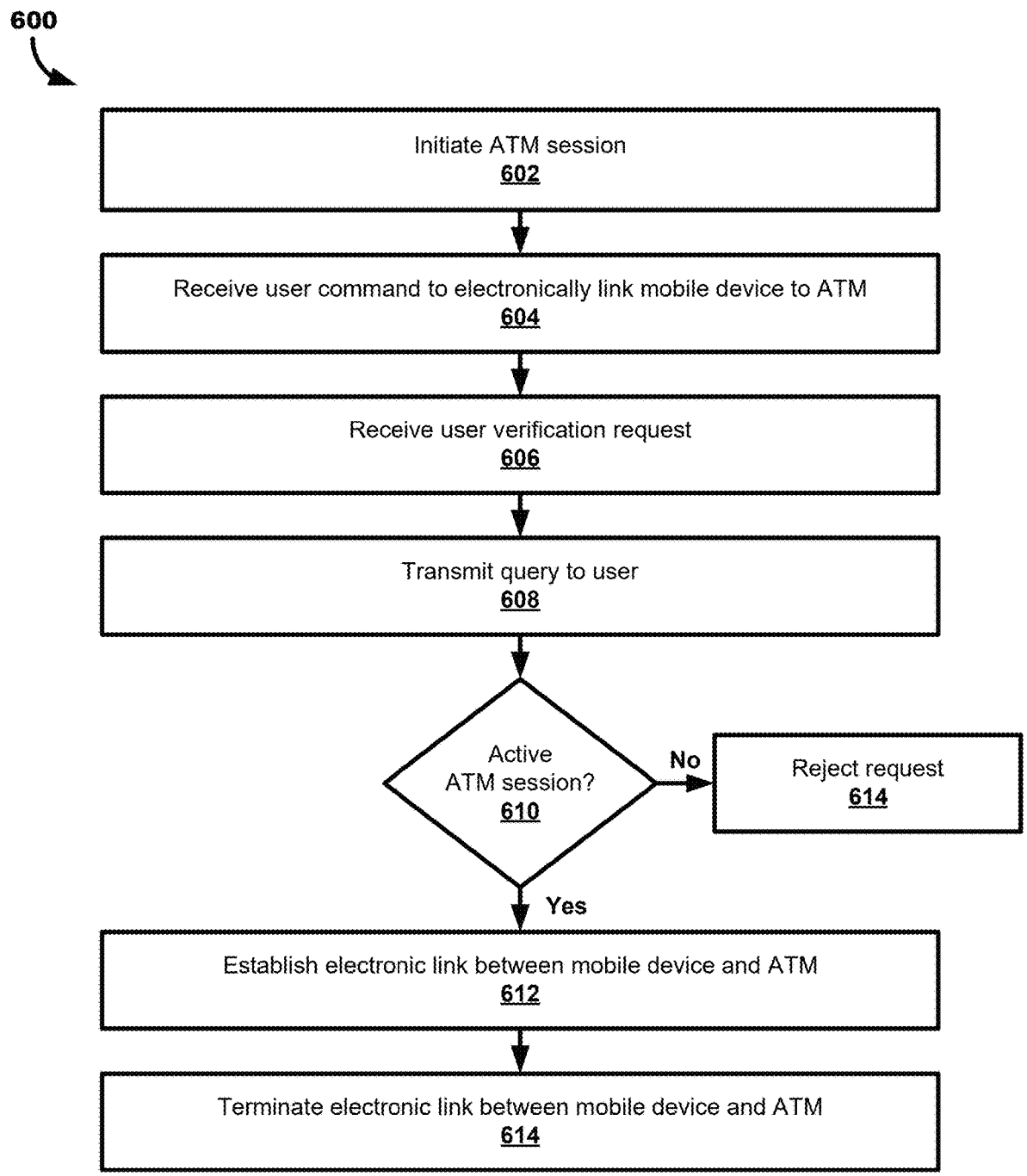
FIG. 6 illustrates a computer-implemented method for establishing an electronic link between a mobile device and an ATM, in accordance with one or more embodiments set forth and described herein.

Illustrated examples shown in FIGS. 5 and 6 set forth computer-implemented methods 500, 600. In one or more examples, the respective flowcharts of the computer-implemented methods 500, 600 may be implemented by the and/or the one or more processors 110 of the ATM 100, and/or the one or more processors 210 of the one or more financial institution servers 200, and/or the one or more processors 410 of the mobile device 400. In particular, the computer-implemented methods 500, 600 may be implemented as one or more engines in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. In accordance with one or more embodiments set forth, described, and/or illustrated herein, software executed by the one or more processors 110 of the ATM 100, and/or the one or more processors 210 of the one or more financial institution servers 200, and/or the one or more processors 410 of the mobile device 400 provides functionality described or illustrated herein. In particular, software executed by the one or more processors 110 of the ATM 100, and/or the one or more processors 210 of the one or more financial institution servers 200, and/or the one or more processors 410 of the mobile device 400 is operable to perform one or more processing blocks of the computer-implemented methods 500, 600 set forth, described, and/or illustrated herein, or provides functionality set forth, described, and/or illustrated.

Figure 7:
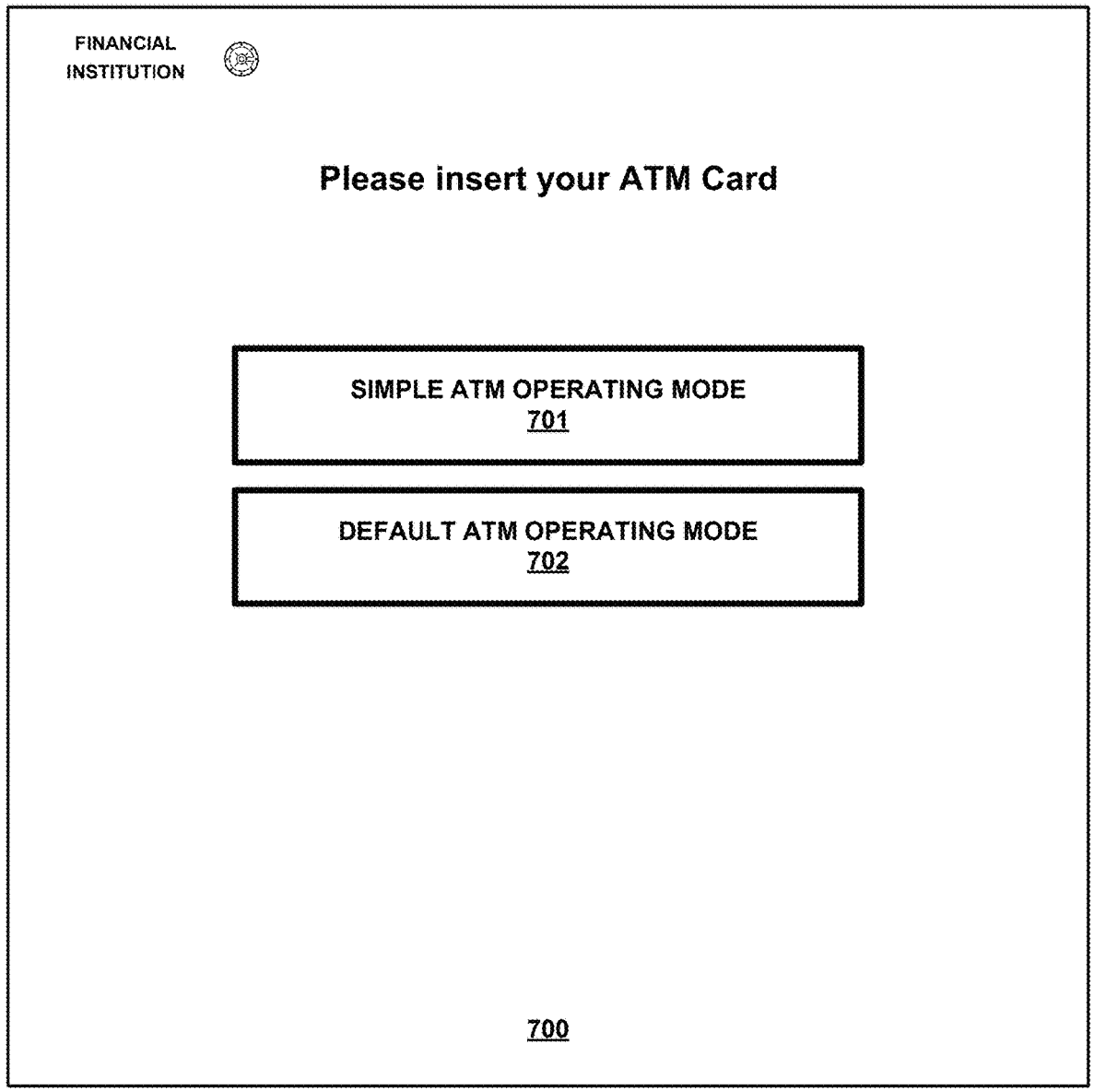
FIG. 7 illustrates a dashboard for visual display on a UI during an initial interactive session between a user and an ATM, in accordance with one or more embodiments set forth and described herein.

As illustrated in FIG. 7, the computer-executable program code may instruct the one or more processors 110 of the ATM 100, and/or the one or more processors 210 of the one or more financial institution servers 200, and/or the one or more processors 410 of the mobile device 400 to cause a visual display of a GUI 700 on the UI 131 of the ATM 100 and/or the UI 431 of the mobile device 400.

As illustrated in FIG. 5, a computer-implemented method 500 of operating an ATM is provided to enable a user to select between two or more ATM operating modes. In the illustrated embodiment, the user can select between a default ATM operating mode and a simple or basic ATM operating mode.

ATMs may be simple to use for the average person, but may be more challenging for a person who has an intellectual impairment. Someone with an intellectual impairment, such as autism, may benefit from interaction with an ATM which utilizes more visual and/or graphical clues (such as icons and pictures) than words. Such a person may find it preferable to interact with the ATM by utilizing a mobile device as it may be more comfortable to use than a ATM. As such, in accordance with one or more embodiments as set forth and described herein, an ATM can enable a user to select between different ATM operating modes in a way that provides a more comfortable UI. Should a simple ATM operating mode (e.g., use of graphical images in instead of words and verbal descriptions) not be activated, the ATM would operate in a default ATM operating mode which is based upon words and verbal descriptions.

As illustrated in FIG. 5, illustrated process block 502 of the computer-implemented method 500 includes entering, by a computing device (e.g., ATM 100 and/or the one or more financial institution servers 200), the ATM into a default ATM operating mode. In the default ATM operating mode, the ATM utilizes written descriptions to describe currency amounts and operations.

The computer-implemented method 500 may then proceed to illustrated process block 504, which includes receiving, by the computing device during an ATM session, a user command to switch from the default ATM operating mode to the simple ATM operating mode. In the simple ATM operating mode, the ATM replaces the written descriptions of currency amounts and operations of the default ATM operating mode with graphical images.

In accordance with process block 504, the user command comprises a verbal user command.

In accordance with process block 504, the user command comprises a textual user command.

In accordance with process block 504, the user command comprises a user selectively engaging a user-engageable icon (e.g., user-engageable icon 602) visually displayed on a UI (e.g., UI 131 of the ATM 100 and/or UI 431 of the mobile device).

In accordance with process block 504, the user command comprises the user scanning, via the mobile device 400, a QR code generated and visually displayed on the UI (e.g., UI 131 of the ATM 100 and/or UI 431 of the mobile device), and then decoding (via the mobile device 400) the QR code to automatically cause the switch from the default ATM operating mode to the simple ATM operating mode. The software application engine (e.g., software application engine 422) can communicate with the ATM (e.g., ATM 100) and verify that the user has an active ATM session. Only upon successful verification, the software application engine can automatically cause the switch from the default ATM operating mode to the simple ATM operating mode.

The computer-implemented method 500 may then proceed to illustrated process block 506, which includes setting, by the computing device, the ATM to the simple ATM operating mode. The application that the ATM is executing would provide code and assets for both the default ATM operating mode and the simple ATM operating mode, and can contain a Boolean variable identifying which of the two modes the ATM is currently operating in.

The computer-implemented method 500 may then proceed to illustrated process block 508, which includes continuing, by the computing device, the ATM session.

In accordance with process block 508, all functionality that can be implemented in the default ATM operating mode can also be implemented in the simple ATM operating mode. For example, the ATM can make cash withdrawals, deposits, account balance inquiries, balance transfers, etc. The ATM session can end when the user has completed a task and does not initiate a new task on the ATM.

The computer-implemented method 500 may then proceed to illustrated decision block 510, which includes determining, by the computing device, whether the current ATM session is terminated.

A number of events may result in termination of the ATM session, including, but not limited to, the lapse of time beyond a predetermined threshold time value (e.g., 30 seconds, 60 seconds, etc.) without receiving any user input or user commands, transmission of a user command (e.g., verbal and/or textual) (e.g., "end this session"), etc.

Should it be determined that the ATM session has not been terminated, then the computer-implemented method 500 returns to illustrated process block 508.

Should it be determined that the ATM session is terminated, then the computer-implemented method 500 proceeds to illustrated process block 512, which includes switching, by the computing device, from the simple ATM operating mode to the default ATM operating mode.

As illustrated in FIG. 6, a computer-implemented method 600 of electronically linking a mobile device to an ATM. In the illustrated embodiment, a user, e.g., someone having intellectual impairment, may feel more comfortable engaging in an ATM session using a mobile device instead of directly interacting with the ATM itself. The user can thus electronically link a mobile device (e.g., mobile device 400) with an ATM (e.g., ATM 100) to thereby conduct, at least in part, an ATM session by proxy via the mobile device. Any functionality that requires use of the physical hardware of the ATM, such as dispensing banknotes, receiving deposits, etc. will still be performed at the ATM. Before utilizing the mobile device to conduct the ATM session, the mobile device must be authenticated. Use of the mobile device to conduct the ATM session may be performed in the default ATM operating mode or the simple ATM operating mode.

As illustrated in FIG. 6, illustrated process block 602 of the computer-implemented method 600 includes initiating, by a computing device (e.g., ATM 100 and/or the one or more financial institution servers 200), an ATM session with an ATM (e.g., ATM 100).

In accordance with process block 602, initiating the ATM session comprises capturing, by the computing device, user authentication credentials and authenticating (e.g., via client authentication engine 222) the captured user authentication credentials to facilitate user access to one or more user financial accounts maintained by a financial institution.

The computer-implemented method 600 may then proceed to illustrated process block 604, which includes receiving, by the computing device, a user command via a mobile device (e.g., mobile device 400) to electronically link the mobile device to the ATM.

In accordance with process block 604, the user command can be conducted through the mobile application engine 427 to access a mobile application associated with the financial institution. For example, the user, after launching a financial institution mobile application and obtaining authenticated access, may selectively engage a user-engageable icon to electronically link to the ATM session. The user can identify the specific ATM by: scanning (via the mobile device) a QR code located on the ATM, or entering a geographic location of the ATM, or authorizing the detection of the current geographic location of the mobile device (to thereby identify the ATM which is determined to be closest in proximity to the mobile device).

In accordance with process block 604, the user command can be conducted through the web browser engine 427 to access a web portal or website associated with the financial institution. For example, the user, after opening a financial institution web portal or website and obtaining authenticated access, may selectively engage a user-engageable icon to electronically link to the ATM session. The user can identify the specific ATM by: scanning (via the mobile device) a QR code located on the ATM, or entering a geographic location of the ATM, or authorizing the detection of the current geographic location of the mobile device (to thereby identify the ATM which is determined to be closest in proximity to the mobile device).

The computer-implemented method 600 may then proceed to illustrated process block 606, which includes receiving, by the computing device, a user verification request via the mobile device.

In accordance with process block 606, the user verification request comprises submission of one or more of user personal identifiable information (PII) and/or user financial data. Such user PII includes, but is not limited to, user name, user address, user phone number, etc. Such user financial data includes, but is not limited to, user account number.

In accordance with process block 606, the user verification request comprises submission of the current geographic location of the mobile device to verify the user is at the same physical location as the ATM.

The computer-implemented method 600 may then proceed to illustrated process block 608, which includes transmitting, by the computing device to the mobile device, a query to the ATM (or another database/server which would contain current ATM sessions) to determine whether the user has a current active session at the ATM.

The computer-implemented method 600 may then proceed to illustrated decision block 610, which includes determining, by the computing device, whether the current ATM session with the user and the ATM is active.

Should it be determined that the ATM session is not active, then the computer-implemented method 600 proceeds to illustrated process block 614, which includes rejecting, by the computing device, the request to establish an electronical link between the mobile device and the ATM.

Should it be determined that the ATM session between the user and the ATM is active, then the computer-implemented method 600 proceeds to illustrated process block 612, which includes establishing, by the computing device, an electronical link between the mobile device and the ATM.

In accordance with process block 612, establishing the electronical link between the mobile device and the ATM enables the user to use the mobile device to input data and information for receipt and/or processing by the ATM (e.g., one or more processors 110) during the active ATM session. In that way, the user does not have to physically touch the UI 131 of the ATM during the active ATM session.

In accordance with process block 612, establishing the electronical link between the mobile device and the ATM enables the user to use the mobile device to receive data and information (e.g., a digital ATM receipt that includes date stamp and location of the ATM session) from the ATM (e.g., one or more processors 110) during the active ATM session. Note that any financial transactions involving tangible objects (e.g., dispensing of currency/banknotes, depositing of currency/banknotes, printing of an ATM receipt), may still be conducted at the ATM.

The computer-implemented method 600 may then proceed to illustrated decision block 614, which includes terminating, by the computing device in response to the termination of the ATM session, the electronical link between the mobile device and the ATM.

As illustrated in FIG. 7, an initial interactive session between a user and an ATM is shown, in accordance with one or more embodiments set forth and described herein. The one or more processors 110 of the ATM 100 and/or the one or more processors 210 of the one or more financial institution servers 200 cause generation of a dashboard 700 for visual display on the UI 131 of the ATM 100 and/or the UI 431 of the mobile device 400. The dashboard 700 includes a prompt for the user to insert an ATM card (e.g., debit card, credit card, etc.). The dashboard 700 also includes one or more user-engageable toggles, tiles, switches, tabs, icons, etc. that enable the user to manage one or more financial accounts maintained by the financial institution on behalf of the user. Such management may include, but is not limited to, performing financial transactions. In this regard, the dashboard 700 includes, but is not limited to, an simple ATM operating mode icon 701 and a default ATM operating mode icon 702. Selective engagement of the ATM operating mode icon 701 and/or the default ATM operating mode icon 702 by the user causes initiation of one or more of the computer-implemented methods illustrated in FIGS. 5 and 6.

Figure 8:
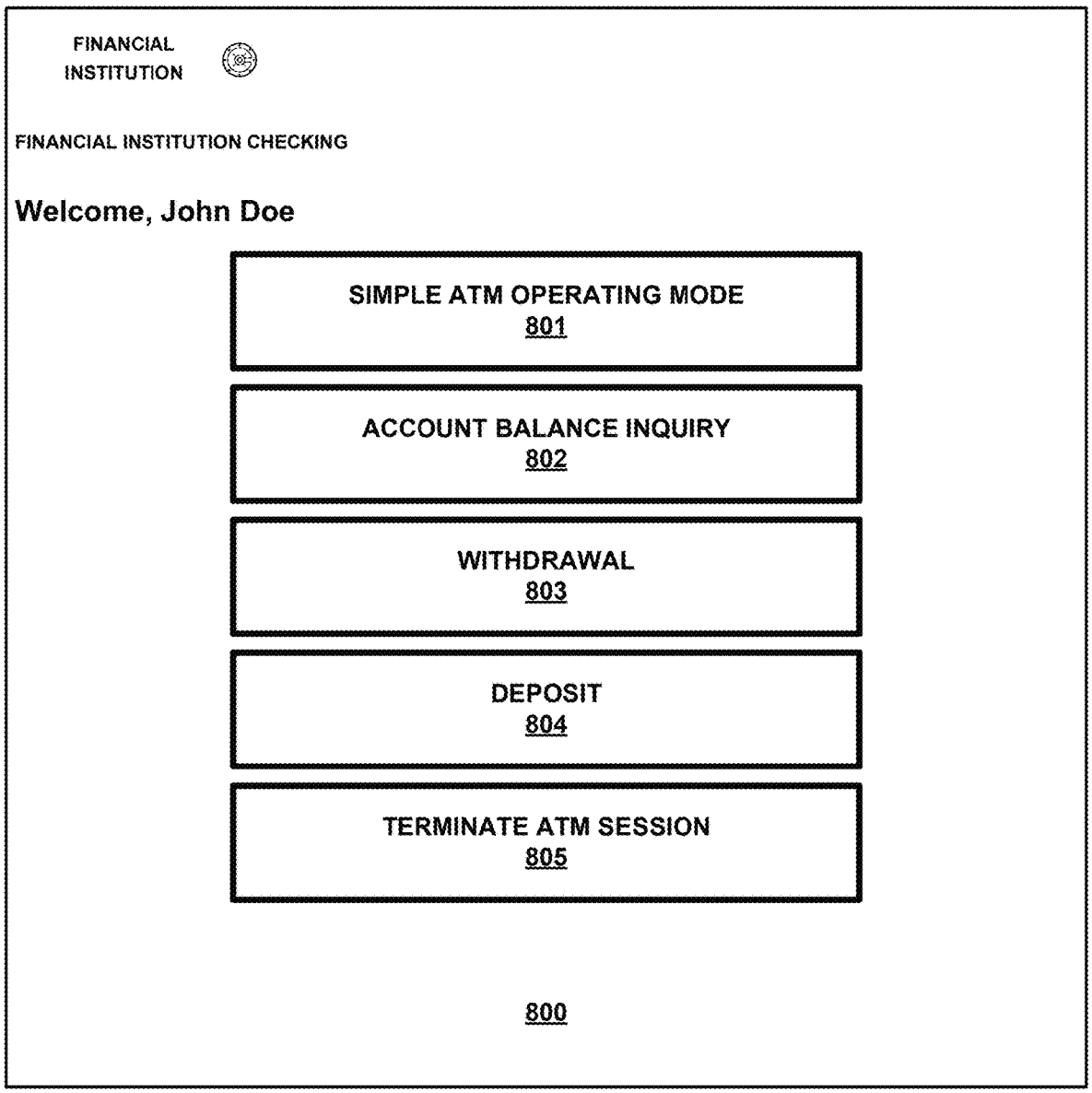
FIG. 8 illustrates a dashboard for visual display on a UI during an interactive session between a user and an ATM, in accordance with one or more embodiments set forth and described herein.

As illustrated in FIG. 8, an initial interactive session between a user and an ATM is shown, in accordance with one or more embodiments set forth and described herein. In response to user insertion of the ATM card and user authentication of the user authentication credentials, the one or more processors 110 of the ATM 100 and/or the one or more processors 210 of the one or more financial institution servers 200 cause generation of a dashboard 800 for visual display on the UI 131 of the ATM 100 and/or the UI 431 of the mobile device 400. The dashboard 800 includes one or more user-engageable toggles, tiles, switches, tabs, icons, etc. that enable the user to manage one or more financial accounts maintained by the financial institution on behalf of the user. Such management may include, but is not limited to, performing financial transactions. In this regard, the dashboard 800 includes, but is not limited to, a simple ATM operating mode icon 801, an account balance inquiry icon 802, a withdrawal icon 803, a deposit icon 804, and a terminate ATM session icon 805. Each of the user-engageable icons buttons 801, 802, 803, 804, and 805 can be activated as in the default ATM operating mode and which would initiate their respective functionality.

Figure 9:
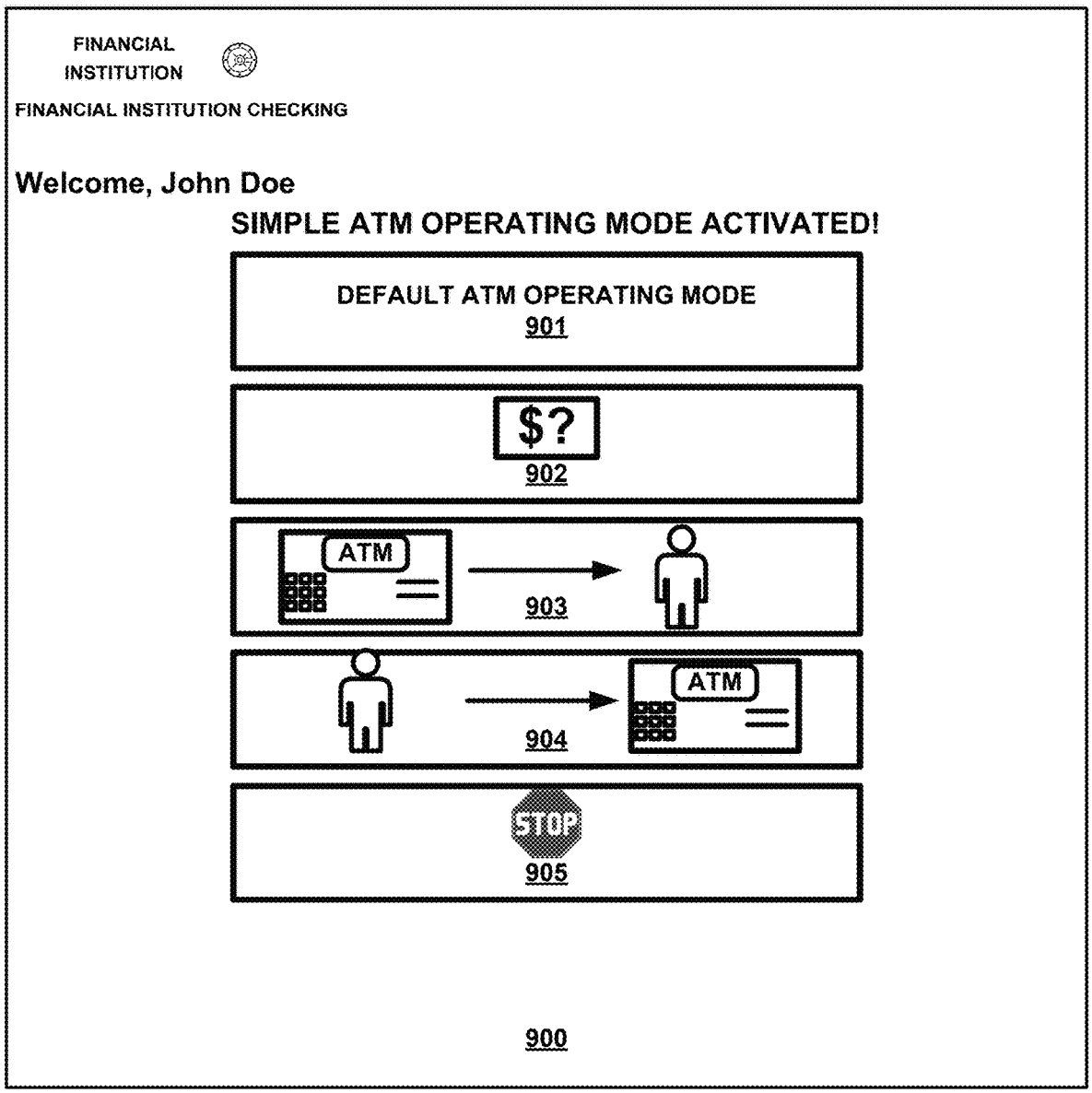
FIG. 9 illustrates a dashboard for visual display on a UI during an interactive session between a user and an ATM in a simple or basic ATM operating mode, in accordance with one or more embodiments set forth and described herein.

As illustrated in FIG. 9, an initial interactive session between a user and an ATM in a simple or basic ATM operating mode is shown, in accordance with one or more embodiments set forth and described herein. In response to user insertion of the ATM card, user authentication of the user authentication credentials, and user engagement of the simple ATM operating mode icon 801, the one or more processors 110 of the ATM 100 and/or the one or more processors 210 of the one or more financial institution servers 200 cause generation of a dashboard 900 for visual display on the UI 131 of the ATM 100 and/or the UI 431 of the mobile device 400. The dashboard 900 includes one or more user-engageable toggles, tiles, switches, tabs, icons, etc. that enable the user to manage one or more financial accounts maintained by the financial institution on behalf of the user. Such management may include, but is not limited to, performing financial transactions. In this regard, the dashboard 900 includes, but is not limited to, a default ATM operating mode icon 901, a graphical image representing an account balance inquiry icon 902, a graphical image representing a withdrawal icon 903, a graphical image representing a deposit icon 904, and a graphical image representing a terminate ATM session icon 905. Use of the graphical images are particularly beneficial to a user having an intellectual impairment, by making it easier to understand graphical images and/or symbols than words.

As illustrated in FIG. 10, an initial interactive session between a user and an ATM showing a withdrawal by the user in a default ATM operating mode is shown, in accordance with one or more embodiments set forth and described herein. In response to user insertion of the ATM card, user authentication of the user authentication credentials, and user engagement of the withdrawal icon 803, the one or more processors 110 of the ATM 100 and/or the one or more processors 210 of the one or more financial institution servers 200 cause generation of a dashboard 1000 for visual display on the UI 131 of the ATM 100 and/or the UI 431 of the mobile device 400. The dashboard 1000 includes one or more user-engageable toggles, tiles, switches, tabs, icons, etc. that enable the user to manage one or more financial accounts maintained by the financial institution on behalf of the user. Such management may include, but is not limited to, performing financial transactions. In this regard, the dashboard 1000 includes, but is not limited to, a simple ATM operating mode icon 1001, and a withdrawal confirmation tile 1002. In the illustrated example embodiment, the user withdraws $76 dollars. The withdrawal confirmation tile 1002 indicates an itemized breakdown of the bills or banknotes to be dispensed by the ATM using written quantities (e.g., "3 $20 bills").

As illustrated in FIG. 11, an initial interactive session between a user and an ATM showing a withdrawal by the user in a simple or basic ATM operating mode is shown, in accordance with one or more embodiments set forth and described herein. In response to user insertion of the ATM card, user authentication of the user authentication credentials, and user engagement of the simple ATM operating mode icon 801, and user engagement of the withdrawal icon 903, the one or more processors 110 of the ATM 100 and/or the one or more processors 210 of the one or more financial institution servers 200 cause generation of a dashboard 1100 for visual display on the UI 131 of the ATM 100 and/or the UI 431 of the mobile device 400. The dashboard 1100 includes one or more user-engageable toggles, tiles, switches, tabs, icons, etc. that enable the user to manage one or more financial accounts maintained by the financial institution on behalf of the user. Such management may include, but is not limited to, performing financial transactions. In this regard, the dashboard 1100 includes, but is not limited to, a default ATM operating mode icon 1101, and a withdrawal confirmation tile 1102. In the illustrated example embodiment, the user withdraws $76 dollars. The withdrawal confirmation tile 1102 indicates an itemized breakdown of the bills or banknotes to be dispensed by the ATM using graphical images that represent the quantity of bills/banknotes. Use of the graphical images are particularly beneficial to a user having an intellectual impairment, by making it easier to understand graphical images and/or symbols than words.

In accordance with one or more embodiments set forth, described, and/or illustrated herein, the ATM 100, the one or more financial institution servers 200, and the mobile device 400, could function in a fully virtualized environment. A virtual machine is where all hardware is virtual and operation is run over a virtual processor. The benefits of computer virtualization have been recognized as greatly increasing the computational efficiency and flexibility of a computing hardware platform. For example, computer virtualization facilitates multiple virtual computing machines to execute on a common computing hardware platform. Similar to a physical computing hardware platform, virtual computing machines include storage media, such as virtual hard disks, virtual processors, and other system components associated with a computing environment. For example, a virtual hard disk can store the operating system, data, and application files for a virtual machine. Virtualized computer system includes computing device or physical hardware platform, virtualization software executing on hardware platform, and one or more virtual machines executing on hardware platform by way of virtualization software. Virtualization software is therefore logically interposed between the physical hardware of hardware platform and guest system software executing "in" virtual machine.

Memory of the hardware platform may store virtualization software and guest system software executing in virtual machine. Virtualization software performs system resource management and virtual machine emulation. Virtual machine emulation may be performed by a virtual machine monitor (VMM) component. In typical implementations, each virtual machine (only one shown) has a corresponding VMM instance. Depending on implementation, virtualization software may be unhosted or hosted. Unhosted virtualization software generally relies on a specialized virtualization kernel for managing system resources, whereas hosted virtualization software relies on a commodity operating system: the "host operating system," such as Windows or Linux to manage system resources. In a hosted virtualization system, the host operating system may be considered as part of virtualization software.

The system and method described herein may be at least partially processor-implemented, the one or more processors 210 being an example of hardware. For example, at least some of the operations of the computer-implemented methods may be performed by the one or more processors 210 or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the the one or more processors 110 of the ATM 100, and/or the one or more processors 210 of the one or more financial institution servers 200, and/or the one or more processors 410, not only residing within a single machine, but deployed across a plurality of machines. In some example embodiments, the one or more processors 110 of the ATM 100, and/or the one or more processors 210 of the one or more financial institution servers 200, and/or the one or more processors 410 or processor-implemented engines may be located in a single geographic location (e.g., within a home environment, an office environment, or a server farm). In other example embodiments, the one or more processors or processor-implemented engines may be distributed across a plurality of geographic locations.

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for a long period of time (e.g. weeks at a time). In addition, devices that are in communication with or coupled with each other may communicate directly or indirectly through one or more intermediaries.

The terms "coupled," "attached," or "connected" may be used herein to refer to any type of relationship, direct or indirect, between the components in query, and may apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An automated teller machine (ATM), comprising:
    one or more processors; and
    a non-transitory memory coupled to the one or more processors, the non-transitory memory including a set of instructions of computer-executable program code, which when executed by the one or more processors, cause the one or more processors to:
    enter the ATM into a default ATM operating mode that enables actions to be visually represented with words;
    authenticate a mobile device of a user;
    detect a current geographic location of the authenticated mobile device;
    verify, based on the detected current geographic location, the authenticated mobile device is at a same physical location as the ATM;
    establish, upon user engagement of a user-engageable icon, an electronical link between the authenticated mobile device and the ATM to thereby facilitate an ATM session by proxy via the authenticated mobile device;
    generate a graphical user interface (GUI) for visual display on the mobile device, the GUI including a dashboard having a user-engageable default ATM operating mode icon and a user-engageable simple ATM operating mode icon that when selectively engaged by the user enables actions to be represented on the GUI with graphical images instead of words and verbal descriptions, the graphical images including graphical images of currency/banknotes; and
    switch, responsive to receipt of a user command by user engagement of the simple ATM operating mode icon during the active ATM session, from the default ATM operating mode to the basic ATM operating mode.

2. The ATM of claim 1, wherein the set of instructions, when executed by the one or more processors, cause the one or more processors to return, in response to termination of the ATM session, to the default ATM operating mode.

3. The ATM of claim 1, wherein the set of instructions, when executed by the one or more processors, cause the one or more processors to visually display output from the ATM on the authenticated mobile device.

4. The ATM of claim 1, wherein signals and commands to the ATM are input by the user via the authenticated mobile device.

5. The ATM of claim 1, wherein the set of instructions, when executed by the one or more processors, cause the one or more processors to terminate, in response to termination of the ATM session, the electronical link between the authenticated mobile device and the ATM.

6. A computer program product comprising at least one non-transitory computer readable medium having with a set of instructions of computer-executable program code, which when executed by one or more processors of an ATM, cause the one or more processors to:
    enter the ATM into a default ATM operating mode that enables actions to be visually represented with words;
    authenticate a mobile device of a user;
    detect a current geographic location of the authenticated mobile device;
    verify, based on the detected current geographic location, the authenticated mobile device is at a same physical location as the ATM;
    establish, upon user engagement of a user-engageable icon, an electronical link between the authenticated mobile device and the ATM to thereby facilitate an ATM session by proxy via the authenticated mobile device;
    generate a graphical user interface (GUI) for visual display on the mobile device, the GUI including a dashboard having a user-engageable default ATM operating mode icon that when engaged enables actions to be visually represented on the GUI with words, and a user-engageable simple ATM operating mode icon that when selectively engaged by the user enables actions to be represented on the GUI with graphical images instead of words and verbal descriptions, the graphical images including graphical images of currency/banknotes; and
    switch, responsive to receipt of a user command by user engagement of the simple ATM operating mode icon during the active ATM session, from the default ATM operating mode to the basic ATM operating mode.

7. The computer program product of claim 6, wherein the set of instructions, when executed by the one or more processors, cause the one or more processors to return, in response to termination of the ATM session, to the default ATM operating mode.

8. The computer program product of claim 6, wherein the set of instructions, when executed by the one or more processors, cause the one or more processors to visually display output from the ATM on the authenticated mobile device.

9. The computer program product of claim 6, wherein signals and commands to the ATM are input by the user via the authenticated mobile device.

10. The computer program product of claim 6, wherein the set of instructions, when executed by the one or more processors, cause the one or more processors to terminate, in response to termination of the ATM session, the electronical link between the authenticated mobile device and the ATM.

11. A computer-implemented method for implementation by an automated teller machine (ATM), the computer-implemented method comprising:
  entering the ATM into a default ATM operating mode that enables actions to be visually represented with words;
  authenticating a mobile device of a user;
  detecting a current geographic location of the authenticated mobile device;
  verifying, based on the detected current geographic location, the authenticated mobile device is at a same physical location as the ATM;
  establishing, upon user engagement of a user-engageable icon, an electronic link between the authenticated mobile device and the ATM to thereby facilitate an ATM session by proxy via the authenticated mobile device;
  generating a graphical user interface (GUI) for visual display on the mobile device, the GUI including a dashboard having a user-engageable default ATM operating mode icon that when engaged enables actions to be visually represented on the GUI with words, and a user-engageable simple ATM operating mode icon that when selectively engaged by the user enables actions to be represented on the GUI with graphical images instead of words and verbal descriptions, the graphical images including graphical images of currency/banknotes; and
  switching, responsive to receipt of a user command by user engagement of the simple ATM operating mode icon during the active ATM session, from the default ATM operating mode to the basic ATM operating mode.

12. The computer-implemented method of claim 11, further comprising returning, in response to termination of the ATM session, to the default ATM operating mode.

13. The computer-implemented method of claim 11, further comprising causing a visual display of output from the ATM on the authenticated mobile device.

14. The computer-implemented method of claim 11, further comprising terminating, in response to termination of the ATM session, the electronical link between the authenticated mobile device and the ATM.

\* \* \* \* \*